March 29, 1949.  D. F. KENNEDY  2,465,593
STRUCTURE FOR PROTECTING, SCREENING,
SHADING AND SIMILARLY NURTURING
PLANTS AND THE LIKE Filed May 15, 1947  2 Sheets-Sheet 1

Inventor,
Donald Frederick Kennedy,
By
Attorney

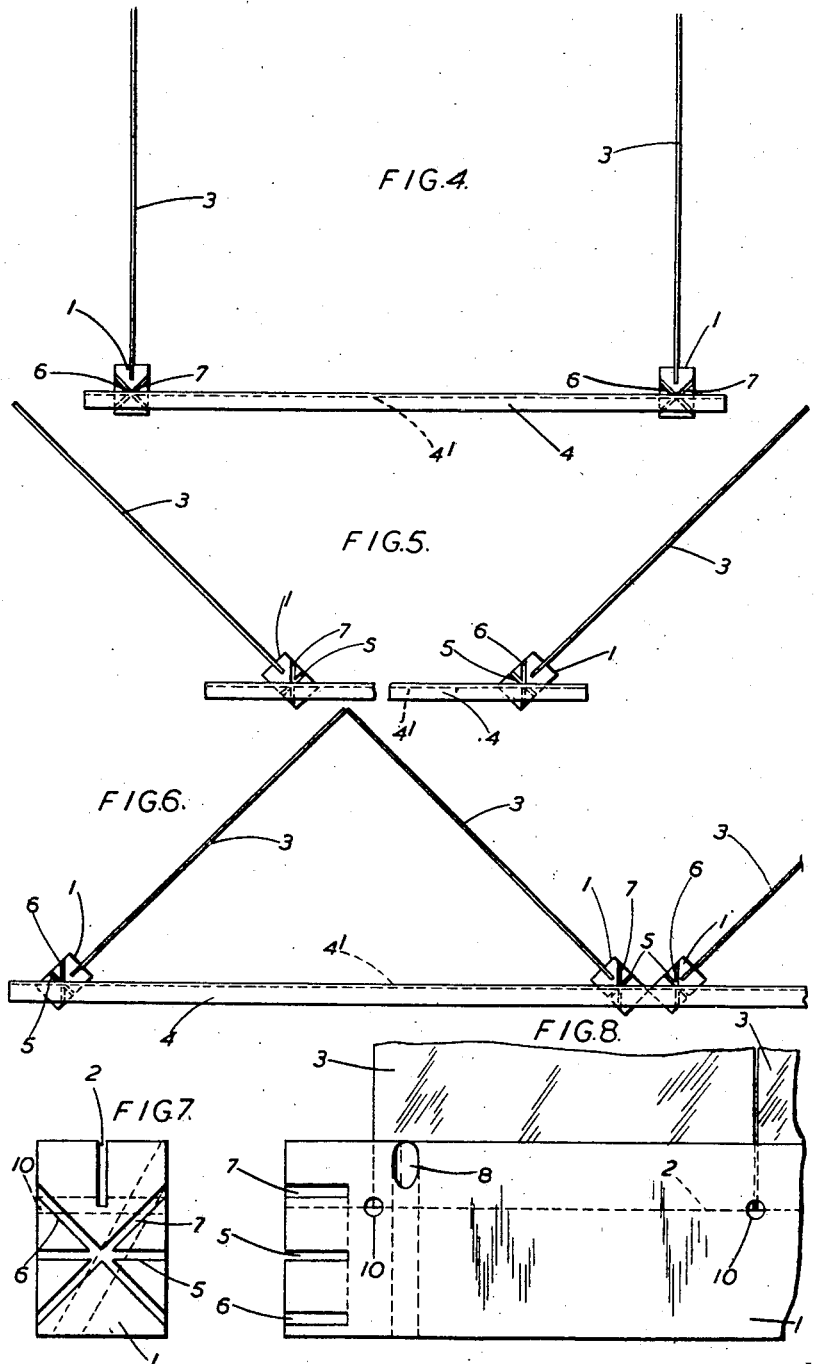

Patented Mar. 29, 1949

2,465,593

UNITED STATES PATENT OFFICE 2,465,593

STRUCTURE FOR PROTECTING, SCREENING, SHADING, AND SIMILARLY NURTURING PLANTS AND THE LIKE

Donald Frederick Kennedy, Littlethorpe, England

Application May 15, 1947, Serial No. 748,200
In Great Britain July 2, 1946

10 Claims. (Cl. 47—26)

This invention relates to structures, such as are employed in or on gardens, nurseries, farms or other horticultural and agricultural establishments, for protecting, screening, shading and similarly nurturing plants or seedlings, and has reference to such structures of the kind comprising holders for supporting opposed plates or panels of glass or other suitable sheet material which are relatively inclined at an angle suchwise as to provide over the plants or seedlings a tent or roof-like protector, screen or shade.

In this connection it is principally the intention to apply the invention to an agricultural cloche, i. e. a structure of the general character comprising a frame adapted for the support of opposed and relatively inclined rows or series of rectangular plates or panes of glass or equivalent transparent sheet material.

In an agricultural cloche as heretofore constructed, the upper meeting or substantially meeting edges of the plates or panes of transparent material have usually been fastened together by wires, clips, or similar fastenings adapted to provide the means whereby the side plates or panes could be handled. Thus, these fastenings were employed to lift the plates or panes out of the frame to provide access to the crop, and also to facilitate reinsertion of the plates or panes into the frame as occasion demanded. Such a construction has been found to be unsatisfactory in as much that having regard to the difficulty experienced in manipulating the plates or panes, the labour involved in attending to the cloche has been considerable. Moreover, the breakages in glass tend to be frequent and costly.

The object of the present invention is to provide a structure for the purposes specified of generally improved and simplified construction, more especially designed to avoid the foregoing disadvantages, as will be hereinafter described.

Broadly considered the structure constituting this invention comprises a pair of spaced longitudinal members the appropriate sides of which are grooved or channelled to receive plates or panes of appropriate sheet material, and one or more transverse members by which the said longitudinal members are adapted to be connected and supported, provision being made whereby the longitudinal members can be turned about their axes and set in various angular positions relatively to the transverse member or members.

In accordance with an important feature of the invention the or each transverse member may be interengageable with end portions of the longitudinal members, in which respect the end faces or appropriate end faces of the last mentioned members may conveniently be slotted or equivalently formed to receive the transverse member or members edgewise, each such end face in the preferred construction being formed with a plurality of slots or the like disposed angularly with respect to each other suchwise as to enable the longitudinal members, after being disengaged from the transverse member or members, to be turned about their axes to vary their angular positions and thereupon to be set in these positions by re-engagement with the said transverse member or members.

The longitudinal members may be of any suitable character. In the preferred embodiment of the invention, however, they consist of wooden beams. Similarly, although the or each transverse member may be of any suitable form, it preferably consists of a length of angle iron in which connection, of course, any rough angle iron of the appropriate size whether drilled or not and irrespectively as to whether it is perfectly straight or not will suffice.

For turning the longitudinal members after they have been disengaged from the transverse member or members it is advantageous to provide a tool, e. g. in the form of a crow bar, in which instance each such longitudinal member may conveniently be bored with one or more appropriately disposed holes adapted for reception of the tool. In this way the longitudinal members can be levered into position.

In order that the invention may be more clearly understood and readily carried into practical effect, a specific example thereof applied to an agricultural cloche will now be described with reference to the accompanying drawings, wherein, Figure 1 is a general perspective view of the said cloche in the closed condition, Figure 2 is a detail perspective view of one end of the cloche, with the transverse angle iron at that end disengaged from the cuts or slots, and the turning tool inserted in one of the beams, Figure 3 is an end view of the cloche in the aforesaid closed condition, Figure 4 is a somewhat similar view but with the glasses set vertically to provide clear access to the interior of the cloche, Figure 5 is a further end view showing the cloche fully open, Figure 6 illustrates the manner in which a whole series of beams can be used in conjunction with a common angle iron or irons, as will be hereinafter described.

Figure 7 is an end view of one of the beams, and

Figure 8 is a detail side elevational view of an end portion of a beam.

Figure 1:
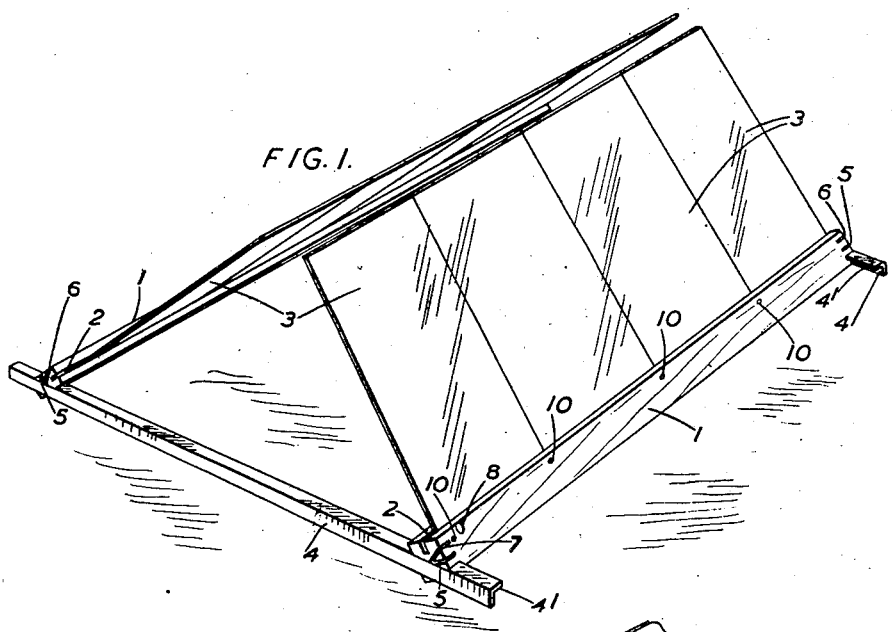

Like parts are designated by similar reference characters throughout the drawings, and Figures 7 and 8 are drawn to a larger scale than the remaining figures.

Referring to Figure 1 it will be seen that the cloche comprises a pair of spaced comparatively long wooden beams 1 which are longitudinally grooved at 2 to receive rectangular panes 3 of glass, and two transverse angle irons 4 one side or flange of each of which is engageable in cuts or slots formed in the adjacent end faces of the said beams. Each of the two beams is of rectangular cross-section measuring, say, 2" x 3" with the longitudinal groove 2 formed centrally in one of its narrower sides. The glass panes 3 are arranged in rows or series closely side by side. The grooves or channels 2 may be 1" deep or thereabouts. The rectangular face at each end of each wooden beam 1 is formed with three cuts or slots 5, 6 and 7 which are relatively disposed angularly and arranged to intersect at a common point centrally between their ends. The cut or slot 5 is 2" long and extends transversely across the beam parallel to and spaced 1¼" from that narrow side thereof opposite to the longitudinally grooved or channelled side. The remaining two cuts or slots 6 and 7—each of which is approximately 3" long—extend diagonally in opposite directions in the form of a cross (see Figure 7). When the beams 1 are vertically disposed as in Figure 4, the lower ends of the cuts or slots 6 and 7 are ¼" above the ground. The cuts or slots 5, 6 and 7 are each approximately 1" deep and formed to receive, edgewise, one side or flange of a length of 1" x ⅛" angle iron. It is to be clearly understood, however, that the aforementioned dimensions are quoted merely by way of example and may be varied according to requirements.

Figure 2:
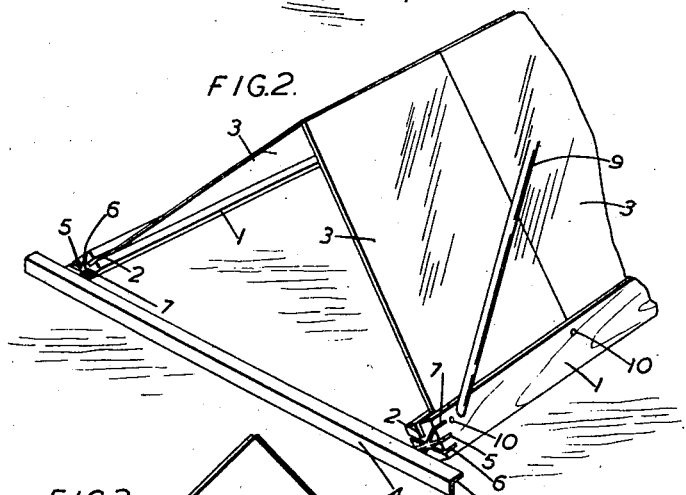
Figure 3:
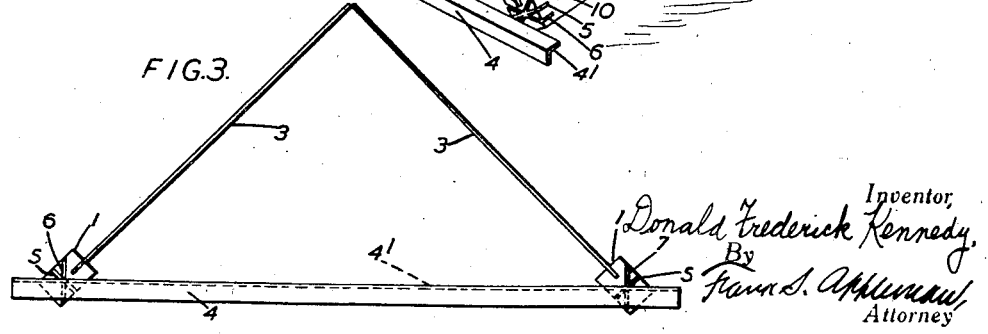

In any event each of the wooden beams 1 is formed with a hole 8 which, as depicted in Figure 7, extends diagonally right through the beam from one corner thereof to or towards the opposite corner and is adapted for the insertion of the leading end of a crow bar or similar tool such as that represented at 9 in Figure 2.

At positions corresponding to the meeting edges of the glass panes 3 and also to the outer side edges of the end panes each of the wooden beams 1 is formed with clear holes 10, e. g. of ¼" diameter or thereabouts, which extend transversely right through the beam. The centers of these holes, as shown in Figure 8, are on a level with the bottom of the longitudinal groove 2 in the beam thereby making provision for the drainage of rainwater from the grooves 2 and helping to preserve the wood.

The idea underlying the invention is that when once the panes 3 have been appropriately positioned in the beams 1 (which function as holders therefor) there is no necessity to remove the panes individually to open up the cloche and provide access to the plants or seedlings, nor is it necessary to handle the panes individually to effect closure of the cloche. With the improved cloche all that is necessary to open and close the same is to vary the relative positions of the opposed panes by appropriately turning the beams about their axes and setting them in the adjusted positions. Thus, to open the cloche the beams 1 would be simply turned from positions in which the opposed panes are relatively inclined towards each other to positions in which the said panes are either vertically disposed or inclined rearwardly, i. e. away from each other. Conversely, to close the cloche the beams 1 would be turned back to their original positions. As will be appreciated, therefore, the beams and the panes they hold and support are movable as units, thereby materially reducing the labour involved when hoeing or otherwise attending to or harvesting a crop, or when sowing a new crop.

Thus, by turning the two beams 1 (complete with glass panes 3) by the aid of the tool 9 provided until corresponding cuts or slots are in alignment horizontally the beams can be supported and connected in these positions by engaging the horizontal sides or flanges $4^1$ of the angle irons 4 within the aligned cuts or slots at opposite ends of the beams. The disposition of the various cuts or slots is such, moreover, that the beams can be tilted and set with the opposed rows or series of glass panes relatively inclined towards each other, each row or series at 45° to the ground as in Figures 1, 2, 3 and 6. Or, by first disengaging the angle irons 4 (as in Figure 2), then turning the beams 1 through 45° into an upright position and thereupon effecting reengagement of the angle irons with the beams, the opposed rows or series of panes can be set vertically to provide clear access to the interior of the cloche as depicted in Figure 4. Again, by turning the beams through a further 45° so that the two rows or series of panes 3 are relatively inclined outwardly, the cloche can be opened more widely (see Figure 5) and, if desired, the glasses can then be employed in conjunction with oppositely inclined rows or series of panes of neighbouring cloches suchwise that when, say, one cloche is open, e. g. for the harvesting of a crop, the adjacent cloches are closed.

Further, to facilitate the germination of seedlings the beams 1 may even be turned flat on their wider sides so that the panes are horizontally disposed close to the ground.

The improved construction is also such as to permit of variation, within limits, of the spacing between the beams 1 by sliding the latter laterally on the transverse angle irons 4. Thus, the upper edges of the opposed rows or series of panes 3 may be brought close together, or they may be spaced apart somewhat, e. g. to the extent of approximately 6" according to season.

In some cases it may be possible to use but a single angle iron, i. e. for engagement in cuts or slots in the beams at one end only of the cloche.

As will be appreciated from the foregoing description a feature of the invention resides in the provision of a series of spaced beams formed as described for use in conjunction with a common angle iron such as that illustrated in Figure 6 at one or each end of the cloche, the idea being that by appropriately setting the beams, and hence also the panes supported thereby, one or more of the cloches thus provided can be open while another or others is or are closed.

When the improved cloche is to be used in an exposed position, it may be found desirable to clip adjoining panes together at the top. Rubber or like clips, suitably grooved or slotted for engagement with the top edges of the panes may conveniently be provided for this purpose. Each such clip may be cube-shaped, being formed with a groove having downwardly convergent sides.

What I claim then is:

1. A structure of the kind herein referred to for nurturing plants, comprising, in combination, a pair of spaced longitudinal members which are longitudinally grooved to receive two opposed series of panes of appropriate sheet material, end faces of the said longitudinal members being formed with slots variously disposed angularly, and a transverse member which is interengageable edgewise with an aligned pair of such slots so as to connect and support the longitudinal members with the two series of panes arranged in desired relative positions the relative angular disposition of the slots enabling the longitudinal members to be turned about their axes and set in various angular positions relatively to the transverse member.

2. A structure of the kind herein referred to for nurturing plants, comprising, in combination, a pair of spaced longitudinal members which are longitudinally grooved to receive two opposed series of panes of appropriate sheet material, end faces of the said longitudinal members being formed with a plurality of slots disposed angularly with respect to each other, and a transverse member which is interengageable edgewise with an aligned pair of such slots so as to connect and support the longitudinal members with the two series of panes arranged in desired relative positions, the relative angular disposition of the aforesaid slots enabling the longitudinal members, after being disengaged from the transverse member, to be turned about their axes to vary their angular positions and thereupon to be set in these positions by re-engagement with the said transverse member.

3. A cloche comprising, in combination, a pair of spaced beams longitudinally grooved to receive two opposed series of glass panes, end faces of the said beams being each formed with slots disposed angularly with respect to each other, and a rigid transverse member which is interengageable edgewise with an aligned pair of such slots so as to connect and support the beams with the two series of panes set in desired relative positions, the relative angular disposition of the slots enabling the beams, together with the series of panes, to be turned about their axes and set in different angular positions relatively to the said transverse member.

4. A cloche comprising, in combination, a pair of spaced beams longitudinally grooved to receive two opposed series of glass panes, end faces of the said beams being each formed with slots disposed angularly with respect to each other, and a length of angle iron the horizontal flange of which is interengageable edgewise with an aligned pair of such slots so as to connect and support the beams with the two series of panes set in desired relative positions, the relative angular disposition of the slots enabling the beams, with their series of panes, to be turned about their axes and set in different angular positions relatively to the length of angle iron.

5. A cloche comprising, in combination, a pair of spaced beams longitudinally grooved to receive two opposed series of glass panes, end faces of the said beams being each formed with slots disposed angularly with respect to each other, and each beam being formed with a hole adapted for reception of a crow bar, and a rigid transverse member which is interengageable edgewise with an aligned pair of such slots so as to connect and support the beams with the two series of panes set in desired relative positions, the relative angular disposition of the slots enabling the beams, together with the series of panes, to be turned about their axes by means of a crow bar and set in different angular positions relatively to the said transverse member.

6. A cloche comprising, in combination, two beams of rectangular cross-section each of which is formed in one of its sides with a longitudinal groove adapted to receive a contiguous series of glass panes, rectangular end faces of the beams being each formed with three slots relatively disposed angularly so as to intersect at a common point, and at least one length of angle iron, one flange of which is engageable in corresponding aligned slots in the beams.

7. A cloche comprising, in combination, two beams of rectangular cross-section each of which is formed in one of its sides with a longitudinal groove adapted to receive a contiguous series of glass panes, rectangular end faces of the beams being each formed with three slots relatively disposed angularly so as to intersect at a common point, one of said slots extending transversely across the beam parallel to the longitudinally grooved side thereof whilst the remaining two slots extend diagonally in opposite directions in the form of a cross, and at least one length of angle iron one flange of which is interengageable edgewise with an aligned pair of such slots so as to connect and support the beams with the two series of panes set in desired relative positions, the relative angular disposition of the slots enabling the beams together with the series of panes to be turned about their axes and set in different angular positions relatively to the length of angle iron.

8. A cloche comprising, in combination, a pair of spaced beams longitudinally grooved to receive two opposed series of glass panes, end faces of the said beams being each formed with slots disposed angularly with respect to each other, and each beam being formed with a hole which extends diagonally therethrough from one corner thereof towards the opposite corner and is adapted for insertion of the leading end of a crow bar, and a rigid transverse member which is interengageable edgewise with an aligned pair of such slots so as to connect and support the beams with the two series of panes set in desired relative positions, the relative angular disposition of the slots enabling the beams, together with the series of panes, to be turned about their axes by means of a crow bar and set in different angular positions relatively to the said transverse member.

9. A cloche according to claim 3, wherein each of the beams has formed therein transverse holes appropriately disposed for the drainage of water from the longitudinal groove in the beam.

10. A cloche comprising, in combination, a pair of spaced wooden beams longitudinally grooved to receive two opposed series of glass panes, the opposite end faces of the beams being each formed with slots disposed angularly with respect to each other, and two rigid transverse members which are interengageable edgewise with aligned pairs of such slots at opposite ends of the beams so as to connect and support the beams with the two series of panes set in desired relative positions, the relative angular disposition of the slots enabling the beams, together with the series of panes, to be turned about their axes and set in different angular positions relatively to the said transverse member.

DONALD FREDERICK KENNEDY.

REFERENCES CITED

The following references are of record in the file of this patent:

UNITED STATES PATENTS

| Number | Name | Date |
|---|---|---|
| 856,237 | Ferriott | June 11, 1907 |
| 1,811,733 | Taylor | June 23, 1931 |

FOREIGN PATENTS

| Number | Country | Date |
|---|---|---|
| 6,912 | Great Britain | 1905 |